United States Patent [19]
Williams

[11] 3,904,606
[45] Sept. 9, 1975

[54] PROCESS FOR PREPARING OPTICALLY ACTIVE 6-(α-AMINO-ACETAMIDO)PENICILLANIC ACIDS AND 7-(α-AMINOACETAMIDO) CEPHALOSPORANIC ACIDS

[75] Inventor: Roger G. Williams, Kalamazoo, Mich.

[73] Assignee: The Upjohn Company, Kalamazoo, Mich.

[22] Filed: Jan. 12, 1973

[21] Appl. No.: 323,072

[52] U.S. Cl......... 260/239.1; 260/243 C; 260/471 A
[51] Int. Cl.$^2$.................................. C07D 499/12
[58] Field of Search..................... 260/239.1, 243 C

[56] References Cited
UNITED STATES PATENTS
3,719,667    3/1973    Gutowski..................... 260/239.1

*Primary Examiner*—Nicholas S. Rizzo
*Attorney, Agent, or Firm*—Martin B. Barancik; Roman Saliwanchik

[57] ABSTRACT

Salts of optically active amine bases and eneamine derivatives of monocarboxylic α-amino acids are disclosed with the process of their preparation. The salts are novel intermediate compounds which make possible a number of advantageous processes not previously known. Thus, there is also disclosed an improved process for the resolution of α-amino acids and new processes for the preparation of optically resolved α-aminoacyl penicillins and cephalosporins and intermediates thereof.

8 Claims, No Drawings

PROCESS FOR PREPARING OPTICALLY ACTIVE 6-(α-AMINO-ACETAMIDO)PENICILLANIC ACIDS AND 7-(α-AMINOACETAMIDO) CEPHALOSPORANIC ACIDS

BACKGROUND OF THE INVENTION

1. Field of the Invention

The invention concerns novel salts of an amine base and an eneamine derivative of an α-amino acid; processes of their preparation, and their use as intermediates in the resolution of α-amino acids. The invention also concerns the preparation of α-aminoacyl penicillins and α-aminoacyl cephalosporins and intermediates thereof employing the novel intermediate salts of the invention.

2. Description of the Prior Art

Alkali metal salts of eneamine derivatives of α-amino acids have been described previously; see Dane, et al., Angew Chem., 76, 342 (1964) and Dane, et al., Chem. Ber., 98,789, (1965). The use of the alkali metal salts as intermediates in preparing synthetic and semisynthetic penicillins has also been disclosed prior hereto; see for example, Long et al., J. Chem. Soc. (C), 1920 (1971) and British Pat. No. 991,586.

The novel amine salts of the invention disclosed herein are distinguishable from the corresponding alkali metal salts in a number of ways. For example, the salts of the invention obtained from racemic mixtures of α-amino acids are diastereoisomeric salts, separable into their respective D- and L- isomer component forms. The alkali metal salts prepared from racemic mixtures of α-amino acids are not diastereoisomeric salts and are not readily separated into D- and L- isomer forms. Furthermore, the stability of the salts of the invention is surprising, in view of the fact that the optically active amine bases employed in their preparation are relatively weak bases and eneamine derivatives of α-amino acids, as acids, are highly unstable.

Furthermore, because of the instability of the eneamine derivatives of α-amino acids, the novel salts of the invention cannot be prepared by the known methods of preparing the corresponding alkali metal salts of eneamine derivatives of α-amino acids. The latter methods require first forming a stable sodium salt of the α-amino acid in view of the above, the preparation of the salts of the invention is unexpected.

SUMMARY OF THE INVENTION

The invention comprises the salt of an optically active amine base and the eneamine derivative of a monocarboxylic α-amino acid. Illustrative of the salts of the invention are those of formula:

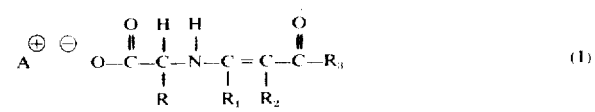

wherein A is a cation formed by the addition of a proton to the nitrogen atom of an optically active amine base; R is selected from hydrocarbyl and hydrocarbyl substituted with an inert group; $R_1$ when taken independently is hydrocarbyl; $R_2$ when taken independently is selected from hydrogen and hydrocarbyl; $R_3$ when taken independently is selected from hydrocarbyl and hydrocarboxy; $R_1$ and $R_3$ when taken together are alkylene having from 2 to 3 carbon atoms, inclusive, separating the valencies thereof; $R_1$ and $R_2$ when taken together and $R_2$ and $R_3$ when taken together each represent alkylene having from 3 to 4 carbon atoms, inclusive, separating the valencies thereof.

The novel salts of the invention, as illustrated by the salts of formula (1) are diastereoisomeric salts existing in D- and L- isomeric forms (in reference to the configuration about the asymmetric α carbon atom of the α-amino acid portion of the molecule). Both enantiomorphs are useful alone or in admixture. Unless a specific configuration is specified hereinafter, reference to the salts of the invention shall be understood to mean both D- and L- isomeric forms.

Those skilled in the art will appreciate that compounds of the invention, as illustrated by the salts of formula (1) may exist in both keto and enol tautomeric forms. It is to be understood therefore that the salts of the invention encompass both keto and enol forms and equilibrum mixtures of such tautomers.

The terms "$R_1$ and $R_3$ when taken together", "$R_1$ and $R_2$ when taken together" and "$R_2$ and $R_3$ when taken together" as used throughout the specification and claims means the indicated groups may be bonded directly together to form a single divalent moiety, for example $R_1$ and $R_3$ when taken together means the moiety—$R_1$—$R_3$—. The term "cation formed by the addition of a proton to the nitrogen atom of an optically active amine base" as used herein means a cation of the general formula:

wherein the free valencies are taken up by hydrogen or organic groups such that the compound thereby represented is a protonated optically active amine base. Illustrative of such cations is the cation obtained upon protonation of ephedrine, i.e.,

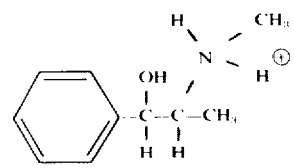

The term "hydrocarbyl" as used throughout the specification and claims means that monovalent moiety obtained upon removal of a hydrogen atom from a parent hydrocarbon. Illustrative of hydrocarbyl are alkyl groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl and isomeric forms thereof; cycloalkyl groups such as cyclopropyl, cyclobutyl, cyclopentyl, cyclohexyl, cycloheptyl, cyclooctyl, 2-methylcyclopentyl, 2,3-dimethylcyclobutyl, 4-methylcyclobutyl, 3-cyclopentylpropyl and the like; cycloalkenyl groups such as cyclobutenyl, cyclopentenyl, cyclohexenyl, cycloheptenyl, cyclooctenyl and the like, including isomeric forms thereof; cycloalkadienyl groups such as cyclopentadienyl, cyclohexadienyl, cycloheptadienyl and the like; aryl groups such as phenyl, tolyl, xylyl, naphthyl, biphenylyl and the like; aralkyl groups such as benzyl, phenethyl, phenpropyl, naphthmethyl and the like.

The term "hydrocarbyl substituted with an inert group" as used herein means a hydrocarbyl group as defined above wherein one or more hydrogen atoms have been replaced with a group inert to reaction with a β-dicarbonyl compound under the conditions hereinafter described.

Illustrative of such inert groups are hydroxyl, thio, mercapto, halogen, nitro- and alkoxy. Representative of hydrocarbyl substituted with an inert group are hydroxyalkyl such as hydroxymethyl, 2-hydroxyethyl, 3-hydroxypropyl, 4-hydroxypentyl, 2-hydroxyoctyl, and the like; hydroxyaryl such as hydroxyphenyl, hydroxytolyl, hydroxyxylyl, hydroxynaphthyl and the like; alkylthio such as methylthio, butylthio, hexylthio; arylthio such as phenylthio; mercaptoalkyl such as 2-mercaptopropyl, 3-mercaptopentyl, 3-mercaptooctyl, mercaptoaryl such as p-mercaptophenyl; haloalkyl such as 2-chloroethyl, 1-bromopropyl, 2-iodobutyl, 2,2,3,3-tetrafluoroethyl; haloaryl such as chlorophenyl, diiodophenyl, and bromonaphthyl; nitroalkyl such as nitromethyl, nitroaryl such as nitrophenyl, alkoxyalkyl such as methoxyethyl, ethoxybutyl, alkoxyaryl such as p-methoxyphenyl, β-butoxynaphthyl and like substituted hydrocarbyls.

The term "hydrocarboxy" as used herein means the monovalent moiety of formula:

-O-hydrocarbyl wherein hydrocarbyl is as defined above. Representative of hydrocarboxy are alkoxy such as methoxy, ethoxy, propoxy, butoxy, pentyloxy, hexyloxy, heptyloxy, octyloxy, nonyloxy, decyloxy, undecyloxy, dodecyloxy and isomeric forms thereof; aryloxy such as phenoxy, naphthoxy and the like; aralkoxy such as benzyloxy, phenethyloxy and the like.

The term "alkylene" as used herein means the divalent moiety obtained by the removal of a hydrogen atom from an alkyl group as previously defined. Illustrative of alkylene groups are 1,2-ethylene, 1,3-propylene, 1,4-butylene, 2,2-dimethyl-1,3-propylene, 3-isopropyl-1,3-propylene and the like.

The invention also comprises methods of preparing and using the salts of the invention as illustrated by the salts of formula (I).

The salts of the invention are useful intermediate compounds in a variety of novel processes. More particularly, the salts of the invention as intermediates make possible a number of useful processes not previously known. The uses of the salts of the invention will be discussed in greater detail hereinafter.

DETAILED DESCRIPTION OF THE INVENTION

The novel salts of the invention are prepared by bringing together in the presence of an inert solvent a monocarboxylic α-amino acid, an optically active amine base and a β-dicarbonyl compound.

The preparation of the salts of the invention is conveniently illustrated by the preparation of those salts having the formula (I) above, according to the schematic formula:

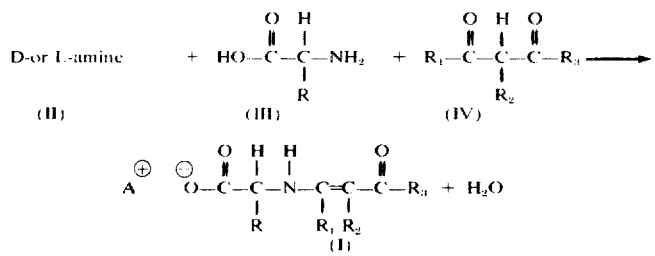

wherein A, R, $R_1$, $R_2$ and $R_3$ are as defined previously.

The proportions of reactants (II), (III), and (IV) are stoichiometric, i.e., substantially equimolar. Preferably, the β-dicarbonyl reactant (IV) and the D- or L-amine base (II) are employed in a molar equivalent excess over the proportion of α-amino acid reactant (III). Most preferably, the β-dicarbonyl (IV) is employed in a 1 to 2 molar excess over the proportion of α-amino acid (III).

The above illustrated reaction proceeds satisfactorily over a broad range of temperatures, i.e., from about room temperature to about 150°C. Preferably, the reaction is carried out at reflux temperature for the particular reaction mixture.

In a preferred embodiment, water by-product formed during the condensation of the amino acid and the β-dicarbonyl compound is removed upon formation. This is accomplished by conventional technique such as by azeotrope distillation, addition of molecular sieves to the reaction mixture, and like methods.

Inert solvents employed in the process of the invention are defined as those organic solvents which will not enter into or in any way alter the desired course of the reaction. Preferably, the solvent is one which serves also as a medium or solvent for separating the diastereoisomers of the salts (I) by fractional crystallization technique. In general, solvents useful in the known methods of resolving α-amino acids through the formation of diastereoisomeric salts are advantageously employed.

Illustrative of such solvents are the alkanols such as methanol, ethanol, propanol, isopropanol, n-butanol, isobutanol, tert-butanol, amyl alcohol, isoamyl alcohol, n-hexanol and the like; halogenated organic solvents such as methyl chloride, methylene chloride, chloroform, carbon tetrachloride, chlorobenzene and the like; aromatic organic solvents such as benzene, toluene, xylene and the like; tetrahydrofuran, ethyl acetate, acetone and the like.

In general, the quantity of solvent employed is not critical. A number of the reactants employed are only slightly soluble in the solvents employed, and the initial reaction mixture is a slurry. As the reaction proceeds, in such instances, the reaction product goes into solution and the amount of insoluble material decreases until the reaction mixture becomes a clear solution, indicating completion of the reaction. Advantageously, the quantity of solvent employed is such that the product compounds are placed in solution at temperatures above ambient, i.e., above circa 25°C.

Completion of the above illustrated reaction generally occurs within about 1 to about 12 hours, depending on the temperature used in carrying out the process of preparation. Progress of the reaction may be monitored by conventional analytical methods. For example, periodic infra-red analysis of the reaction mixture will show the disappearance of amine and/or β-dicarbonyl reactants, thereby indicating the progress of the reaction.

Upon completion of the reaction, the reaction mixture contains a diastereoisomeric mixture of salts of the formula (I).

The D, L-diastereoisomeric mixture of the salts (I) are readily separated from the reaction mixture by conventional methods of crystallization, ion-exchange chromatography and like techniques. Generally, the D-isomeric and L-isomeric components of the diastereoisomeric mixtures exhibit substantially different solubilities in various solvents and therefore are readily separated from each other by conventional methods of fractional crystallization when separation is desired. As is well known in the art, one cannot predict with absolute certainty which of the conventionally employed solvent mediums will provide the most favorable solubility differentials for separating the component isomers of diastereoisomeric salts. The conventional procedure is by trial and error, employing any common organic solvents, i.e., aliphatic and aromatic hydrocarbons, organic ethers, esters, ketones, alcohols, halogenated forms thereof and mixtures thereof.

Also, sometimes a particular isomeric form of a diastereoisomeric salt is so highly soluble in a given solvent medium that it is difficult to obtain a crystal precipitate. Under these circumstances, it is generally found that the corresponding isomer formed from the antipode of the optically active amine employed in the preparation of the soluble diastereoisomer will be substantially less soluble in the same solvent medium. The techniques of separating isomeric components of diastereoisomeric mixtures is so well known that further discussion herein is not necessary, see for example, "Chemistry of the Amino Acids," supra., Chapter 9.

Optically active amine bases used in preparing the salts of the invention are generally well known compounds and include aliphatic and cycloaliphatic, secondary and tertiary amines which may be straight or branched chain, saturated or unsaturated. They are particularly characterized by having dissociation constants ranging from about $10^{-3}$ to about $10^{-12}$. Particularly preferred as the optically active amine bases are optically active tertiary amines meeting the basicity requirement. Illustrative of optically active amine bases are both the D-isomers and the L-isomers of brucine, cinchonidine, cinchonine, ephedrine, methylephedrine, N,N-dimethyl-α-phenethylamine, fenchylamine, morphine, quinidine, quinine, α-phenylethylamine, strychnine, threo-1-p-nitrophenyl-2-aminopropane-1:3-diol, dehydroabietylamine, and the like.

Any monocarboxylic α-amino acid may be used according to the processes of the invention. Included without limitation are aliphatic, cycloaliphatic, aromatic and heterocyclic α-amino acids. Illustrative of monocarboxylic α-amino acids are those of formula (III) above. The amino acids of formula (III) are a well known class of compound, prepared by a variety of well known procedures; for example, by reduction of α-oximino acids (Barry et al., J. Org. Chem., 12, 460 (1947); by hydrolysis of hydantoins (Ware, Chem. Revs. 46, 403, (1950); by reaction of α-halo acids with ammonia (Marvel, Org. Syn., Vol. 20, pg. 106; Vol. 21, pgs. 60 and 74); reductive amination of α-keto acids [Knoop et al., Z. physiol. Chem., 148, 294 (1925) and 170, 186 (1927)]; and from α-amino cyanides by the well known Strecker synthesis (Allen et al., Org. Syn., Coll. Vol. 3, 275). A review of various α-amino acids and methods of synthesis can be found in the text "Chemistry of the Amino Acids," supra., Chapter 8.

Representative of monocarboxylic α-aminoacids are α-aminopropionic acid (alanine), α-aminoisovaleric acid (valine), α-aminovaleric acid (norvaline), α-aminoisocaproic acid (leucine), α-aminocaproic acid (norleucine), α-amino-β-methylethylpropionic acid (isoleucine), α-aminooctanoic acid, α-amino oenanthic acid, α-aminocaprylic acid, α-aminopelargonic acid, α-aminocapric acid, α-aminolauric acid, α-aminomyristic acid, α-aminostearic acid and α-aminoarachidic acid; α-amino-β-hydroxypropionic acid (serine), α-amino-β-hydroxybutyric acid, α-amino-β-thiopropionic acid (cysteine), α-amino-γ-methylthio-butyric acid (methionine), β-chloroalanine, 4-nitroleucine, 4-methoxyleucine, 1-aminocyclopropanecarboxylic acid, 1-aminocyclobutanecarboxylic acid, 1-amino-2-methylcyclobutanecarboxylic acid, 1-aminocyclopentanecarboxylic acid, 1-aminocyclohexanecarboxylic acid, 1-aminocycloheptanecarboxylic acid, 1-amino-2-ethylcycloheptanecarboxylic acid, 1-aminocyclodecanecarboxylic acid, 1-amino-3-bromocyclohexanecarboxylic acid, 1-amino-3-fluorocyclohexanecarboxylic acid, and 1-amino-2-hydroxycyclohexanecarboxylic acid; 1-aminocyclobut-2-ene-carboxylic acid, and 1-aminocyclohex-2-ene-carboxylic acid; 1,4-cyclohexadienyl-α-aminoacetic acid, α-amino-2,4,6-cycloheptatrieneacetic acid, α-amino-(4-bromo-2,4,6-cycloheptatriene-1-yl)-acetic acid and α-amino(4-methyl-2,4,6-cycloheptatrien-1-yl)-acetic acid; α-aminophenylacetic acid, α-aminonaphthyl-acetic acid, α-amino-p-hydroxyphenylacetic acid, α-amino-p-chlorophenylacetic acid, α-amino-2,4-dibromophenylacetic acid, α-amino-2-nitrophenylacetic acid; α-amino-p-methoxyphenylacetic acid and α-amino-2-butoxyphenylacetic acid; α-amino-β-phenylpropionic acid (phenylalanine), α-amino-β-(p-hydroxyphenyl)propionic acid, α-amino-β-phenylbutyric acid; azetidine-2-carboxylic acid, proline, 4-methylproline, pipecolic acid, histidine, tryptophane, tyrosine, 3,5-dibromotyrosine, thyroxine, threonine, allohydroxyproline, 4-hydroxypipecolic acid, penicillamine, and like α-amino acids.

The β-dicarbonyl compounds employed as starting materials in preparing the salts of the invention are well known β-diketones and β-diketoesters as shown by those represented by the formula (IV). They are conveniently prepared by a number of well known methods (see for example, Wagner and Zook, "Synthetic Organic Chemistry," John Wiley & Sons, New York, N.Y. (1953) at page 342). Illustrative of β-dicarbonyl compounds are acetylacetone, propionylacetone, n-butyrylacetone, i-butyrylacetone, n-valerylacetone, pivaloylacetone, caproylacetone, dipropionylmethane, propionyl-n-butyrylmethane, propionyl-isovalerylmethane, propionyl-isocaprylmethane, di-n-butyrylmethane, diisobutyrylmethane, diisovalerylmethane, diisocaprylylmethane, methyldiacetylmethane, ethyldiacetylmethane, 3-methyl-2,4-hexanedione, diacetylethylmethane, 3-methyl-2,4-heptanedione, n-propyldiacetylmethane, isopropyldiacetylmethane, n-butyldiacetylmethane, methylpropionylbutyrylmethane, t-butyldiacetylmethane, n-hexyldiacetylmethane; 3-cyclopentyl-2,4-pentanedione, 3-(1,3,5-cycloheptatrien-1-yl)-2,4-pentanedione, 1-cyclopropyl-1,3-pentanedione, 1,3-di-3-cyclohexen-1-yl-1,3-propanedione; benzoylacetone, dibenzoylmethane, benzoylmethylmethane, dibenzoylmethylmethane, ethylacetylbenzoylmethane, isopropylacetylbenzoylmethane, benzylacetylbenzoylmethane, benzyldiacetylmethane, methyl acetoacetate, ethyl acetoacetate, butyl acetoacetate, heptyl acetoacetate, hexyl acetoacetate, phenyl acetoacetate, ethyl α-methylacetoacetate, ethyl α-ethylacetoacetate, ethyl α-n-propylacetoacetate, ethyl α-isopropylacetoacetate, ethyl α-sec-butylacetoacetate, ethyl α-phenylacetoacetate, ethyl α-benzylacetoacetate and the like; 1,3-cyclopentadione, 2,4-diphenylcyclopentane-1,3-dione, 1,3-cyclohexadione, 5,5-dimethylcyclohexane-1,3-dione (dimedone) and the like; 2-acetylcyclopentanone, 2-acetylcyclohexanone and the like.

Preferred β-dicarbonyl compounds for use in the processes of the invention are those of formula (IV) wherein $R_1$ is lower hydrocarbyl (i.e., having from 1 to 6 carbon atoms, inclusive), $R_2$ is hydrogen and $R_3$ is lower hydrocarbyl or lower hydrocarboxy (i.e., having from 1 to 6 carbon atoms, inclusive).

The following examples describe the manner and process of making and using the invention and set forth the best mode contemplated by the inventor of carrying out the invention, but are not to be construed as limiting.

EXAMPLE 1

To a slurry of 2 grams (0.012 moles) of D,L-p-hydroxyphenylglycine in 20 ml. of methanol there is added with stirring 1.8 ml. (1.9 grams; 0.016 moles) of methyl acetoacetate and 2.5 grams (0.014 moles) of D-N-methylephedrine. The resulting slurry mixture is heated at reflux temperature for about 5 hours. At the end of this period, the reaction mixture is a clear solution and the starting D,L-p-hydroxyphenylglycine is no longer visible as a solid in the reaction mixture. The hot reaction mixture is diluted with 20 ml. of ethyl acetate and allowed to cool to room temperature. Upon standing overnight there is obtained a precipitate. The precipitate is separated by filtration, washed with a mixture of methanol-ethyl acetate (1:1, v/v) and dried under reduced pressure to obtain 2.2 grams (82.5% of theory) of the salt of D-N-methylephedrine and N-[2-(methoxycarbonyl)-1-methylvinyl]-D-p-hydroxyphenylglycine in the form of white crystals, m.p. 180°–182°C., $[\alpha]_d^{25} = +85°$ (1% in 0.1 N NaOH).

The filtrate obtained above contains the soluble salt of D-N-methylephedrine and N-[2(methoxycarbonyl)-1-methylvinyl]-L-p-hydroxyphenylglycine which is readily separated from the filtrate as a crystal precipitate by concentrating the filtrate and seeding with an authentic crystal of the salt of D-N-methylephedrine and N-[2(methoxycarbonyl)-1-methylvinyl]-L-p-hydroxyphenylglycine.

EXAMPLE 2

An appropriate reaction vessel is charged with 5 grams (0.033 moles) of D,L-phenylglycine, 50 ml. of methanol, 5 ml. (0.046 moles) of methyl acetoacetate and 6 grams (0.033 moles) of L-N-methylephedrine. The mixture is refluxed overnight and then an additional 2 ml. (2.1 grams, 0.018 moles) of methyl acetoacetate is added. Refluxing is continued an additional two hours, after which the hot reaction mixture is filtered. The filtrate is cooled slowly to room temperature, whereupon there is obtained a slurry of crystal precipitate. The slurry is diluted with 10 ml. of methanol and filtered in a second filtration. The crystal residue is washed with methanol and dried under reduced pressure to obtain 4.41 grams (62.3% of theory) of the salt of L-N-methylephedrine and N-[2-(methoxycarbonyl)-1-methylvinyl]-D-phenylglycine in the form of white crystals, M.P. 168°–169°C.

The filtrate of the second filtration described above contains the soluble salt of L-N-methylephedrine and N-[2-(methoxycarbonyl)-1-methylvinyl]-L-phenylglycine, said salt being readily separated from the filtrate by concentrating the filtrate, whereupon the salt precipitates as a crystalline solid.

Repeating the above procedure, but replacing the L-N-methylephedrine as used therein with an equal molar proportion of D-N-methylephedrine, there is obtained as a residue of the second filtration, the salt of D-N-methylephedrine and N-[2-(methoxycarbonyl)-1-methylvinyl]-L-phenylglycine.

EXAMPLE 3

An appropriate reaction vessel is charged with 2 grams (0.013 moles) of D,L-phenylalanine, 20 ml. of methanol, 1.8 ml. (1.9 grams; 0.016 moles) of methyl acetoacetate and 2.5 grams (0.014 moles) of D-N-methylephedrine. The mixture is refluxed for about three hours, after which solvent is removed by evaporation. An aliquot of the residual oil is dissolved in 1 ml. of a mixture of benzene-Skellysolve B (1:1 by volume) and the side of the container scratched until crystals form. The remainder of the residual oil is dissolved in a mixture of 5 ml. of benzene and 5 ml. of Skellysolve B and the resulting solution seeded with the crystals obtained as described above. A precipitate of crystals is obtained and the resulting mixture is diluted with 10 ml. of benzene. The diluted mixture is filtered and the residue washed with benzene-Skellysolve B (1:1 parts by volume).

Essentially n-hexane, boiling point 60°C. to 68°C., Skelly Oil Co., Inc. The washed crystals are dried to give 1.55 grams of the salt of D-N-methylephedrine and N-[2-(methoxycarbonyl)-1-methylvinyl]-D-phenylalanine in the form of white crystals, M.P. 120°–123°C. An additional 0.64 grams of product (2.19 grams total) 78.2% of theory is obtained by concentration of the last described filtrate.

Similarly, repeating the above procedure but replacing the D-N-methylephedrine as used therein with an equimolar proportion of L-N-methylephedrine, there is obtained as a precipitate the salt of L-N-methylephedrine and N-[2-(methoxycarbonyl)-1-methylvinyl]-L-phenylalanine.

EXAMPLE 4

A mixture of 2 grams (0.017 moles) of D,L-valine, 20 ml. of methanol, 2.6 ml. (2.7 grams; 0.023 moles) of methyl acetoacetate and 3.1 grams (0.017 moles) of L-N-methylephedrine is heated at reflux temperature for about three hours. At the end of this period, solvent is removed under reduced pressure and the residue dissolved in a mixture of 10 ml. of ethyl acetate and 19 ml. of Skellysolve B. (supra.). The resulting mixture is a turbid solution, to which 10 ml. of ethyl acetate is added. The resulting mixture is filtered and the filtrate evaporated to dryness. The residue is dissolved in a mixture of 10 ml. of ethyl acetate and 17 ml. of Skellysolve B. The solution is seeded with an authentic crystal of the salt of L-N-methylephedrine and N-[2-(methoxycarbonyl)-1-methylvinyl]-D-valine, whereupon a precipitate appears. The mixture is diluted with 4 ml. of ethyl acetate and 6 ml. of Skellysolve B., filtered and the residue washed with a mixture of ethyl acetate-Skellysolve B. (1:2, v/v). The washed residue is dried to obtain 1.15 grams of the salt of L-N-methylephedrine and N-[2-(methoxycarbonyl)-1-methylvinyl]-D-valine in the form of white crystals, which sinter at 91°C. Upon further treatment of the last filtrate described above, there is obtained an additional 0.85 grams (total yield 2.0 grams; 59.5% of theory) of the salt of L-N-methylephedrine and N-[2-(methoxycarbonyl)-1-methylvinyl]-D-valine.

Similarly, repeating the above procedure but replacing the L-N-methylephedrine as used therein with an equal molar proportion of D-N-methylephedrine there is obtained the salt of D-N-methylephedrine and N-[2-(methoxycarbonyl)-1-methylvinyl]-L-valine.

EXAMPLE 5

Following the procedure of Example 1. supra., but replacing the D,L-p-hydroxyphenylglycine as used therein with an equal molar proportion of D,L-racemates of the following α-amino acids; alanine, α-aminostearic acid, serine, 1-aminocyclohexanecarboxylic acid, 1-aminocyclo-but-2-enecarboxylic acid, 1,4-cyclohexadienyl-α-aminoacetic acid, α-amino-p-methoxyphenylacetic acid and α-amino-p-chlorophenylacetic acid, respectively, there are obtained the diastereoisomeric salts of D-N-methylephedrine and N-[2-(methoxycarbonyl)-1-methylvinyl]-alanine, N-[2-(methoxycarbonyl)-1-methylvinyl]-α-aminostearic acid, N-[2-(methoxycarbonyl)-1-methylvinyl]-serine, N-[2-(methoxycarbonyl)-1-methylvinyl]-1-aminocyclohexanecarboxylic acid, N-[2-methoxycarbonyl)-1-methylvinyl]-1-aminocyclobut-2-ene-carboxylic acid, N-[2-(methoxycarbonyl)-1-methylvinyl]-1,4-cyclohexadienyl-α-aminoacetic acid, N-[2-(methoxycarbonyl)-1-methylvinyl]-α-amino-p-methoxy-phenylacetic acid and N-[2-(methoxycarbonyl)-1-methylvinyl]-α-amino-p-chlorophenylacetic acid, respectively.

EXAMPLE 6

Following the method of Example 1, supra, but replacing the D-N-methylephedrine as used therein with an equimolar proportion of the D- forms, respectively, and then with the L- forms, respectively, of brucine, cinchonidone, cinchonine, ephedrine, N,N-dimethyl-α-phenethylamine, fenchylamine, morphine, quinidine, quinine, α-phenylethylamine, strychnine, dehydroabietylamine and threo-1-p-nitrophenyl-2-aminopropane-1:3-diol, respectively, there is obtained in each instance the corresponding salts of D-brucine, D-cinchonidone, D-cinchonine, D-ephedrine, D-N,N-dimethyl-α-phenethylamine, D-fenchylamine, D-morphine, D-quinidine, D-quinine, D-α-phenylethylamine, D-strychnine, D-dehydroabietylamine, D-threo-1-p-nitrophenyl-2-aminopropane-1:3-diol, L-brucine, L-cinchonidone, L-cinchonine, L-ephedrine, L-N,N-dimethyl-α-phenethylamine, L-fenchylamine, L-morphine, L-quinidine, L-quinine, L-α-phenylethylamine, L-strychnine L-dehydroabietylamine, and L-threo-1-p-nitrophenyl-2-aminopropane-1:3-diol with N-[2-(methoxycarbonyl)-1-methylvinyl]-D-p-hydroxyphenylglycine and N-[2-(methoxycarbonyl)-1-methylvinyl]-L-p-hydroxyphenylglycine, respectively.

Similarly, repeating the procedure of Example 1, supra., but replacing the methyl acetoacetate as used therein with an equal molar equivalent proportion of acetylacetone, methyldiacetylmethane, benzoylacetone, dibenzoylmethane, benzylacetylbenzoylmethane, 1,3-cyclohexadione, 2-acetylcyclohexanone and 1-cyclopropyl-1,3-pentanedione, respectively, there is obtained the salts of D-N-methylephedrine and N-[2-(methylcarbonyl)-1-methylvinyl]-D-p-hydroxyphenylglycine and N-[2-(methylcarbonyl)-1-methylvinyl]-L-p-hydroxyphenylglycine; N-[2-methyl-(2-methylcarbonyl)-1-methylvinyl]-D-p-hydroxyphenylglycine and N-[2-methyl-(2-methylcarbonyl)-1-methylvinyl]-L-p-hydroxyphenylglycine; N-[2-(phenylcarbonyl)-1-methylvinyl]-D-p-hydroxyphenylglycine and N-[2-(phenylcarbonyl)-1-methylvinyl]-L-p-hydroxyphenylglycine; N-[2-(phenylcarbonyl)-1-phenylvinyl]-D-p-hydroxyphenylglycine and N-[2-phenylcarbonyl)-1-phenylvinyl]-L-p-hydroxyphenylglycine; N-[2-benzyl-(2-phenylcarbonyl)-1-methylvinyl]-D-p-hydroxyphenylglycine and N-[2-benzyl-(2-phenylcarbonyl)-1-methylvinyl]-L-p-hydroxyphenylglycine; N-(3-oxo-1-cyclohexenyl)-D-p-hydroxyphenylglycine and N-(3-oxo-1-cyclohexenyl)-L-p-hydroxyphenylglycine; N-(2-acetyl-1-cyclohexenyl)-D-p-hydroxyphenylglycine and N-(2-acetyl-1-cyclohexenyl)-L-p-hydroxyphenylglycine; and N-(2-ethylcarbonyl)-1-cyclopropylvinyl]-D-p-hydroxyphenyl-glycine and N-(2-ethylcarbonyl)-1-cyclopropylvinyl]-L-p-hydroxyphenylglycine.

The following Examples illustrate the use of the novel salts of the invention:

In the presence of a strong mineral acid or strong organic acid, such as for example, concentrated hyrochloric acid, sulfuric acid, perchloric acid, and p-toluenesulfonic acid, the salts of the invention are decomposed to regenerate the α-amino acids from which they were prepared. Preferred as the strong acid is a strong mineral acid as illustrated above. The proportion of acid required is about one molar equivalent. Preferably, the decomposition of the salts of the invention is carried out in the presence of an inert solvent for the salt as previously defined, and at ambient temperature. Examples of preferred inert solvents are water, methanol, methylene chloride, and acetone.

When the salts of the invention have been separated into their respective diastereoisomer forms; i.e., into their D- and L- isomeric forms and the separate isomers are treated with the strong acid according to the above procedure, there is obtained the corresponding optically active enantiomorph of the α-amino acid racemate employed in preparing the salts of the invention. The optically active α-amino acid is readily separated from the acid-solvent reaction mixture by crystallization, employing conventional techniques.

Thus, the salts of the invention serve as intermediates in a novel process for preparing an optically active monocarboxylic α-amino acid which comprises, (1), bringing together in the presence of an inert solvent the racemate of said α-amino acid, an optically active amine base and a β-dicarbonyl compound, whereby there is obtained a mixture of the D- and L- diastereoisomeric salts of said amine base and the eneamine derivative of said α-amino acid; (2) separating the D- and L- isomers of said mixture of diastereoisomeric salts; and (3) treating the separated isomer with a strong acid. Preferred β-dicarbonyl compounds employed in the above resolution procedure are those of formula (IV) as previously described, and most preferred are those of formula (IV) wherein $R_1$ is lower hydrocarbyl, $R_2$ is hydrogen and $R_3$ is lower hydrocarbyl or lower hydrocarboxy.

The novel process described above for resolving α-amino acids has a number of advantages over the prior known methods employing diastereoisomeric salt intermediates. For example, fewer procedural steps are required and the overall product yield and purity is substantially improved.

EXAMPLE 7

To a slurry of 2.2 grams (0.00495 moles) of the salt of D-N-methylephedrine and N-[2-(methoxycarbonyl)-1-methylvinyl]-L-p-hydroxyphenylglycine (Example 1, supra) in 7 ml. of methylene chloride and 3 ml. of methanol, there is added with stirring 0.41 ml. of concentrated hydrochloric acid. The reaction mixture is immediately transformed to a clear solution from which a precipitate begins to appear. After standing for about 30 minutes at room temperature, the reaction mixture is filtered. The residue is washed with 3 ml. of a mixture of methylene chloride-methanol (7:3, v/v) and dried under vacuum to obtain 0.75 grams (91% of theory) of D-p-hydroxyphenylglycine in the form of white crystals, M.P. 217°C. (dec.), $[\alpha]_d^{25} = -157°$ (1% in 1N HCl).

EXAMPLE 8

To an appropriate reaction vessel there is charged 4.41 grams (0.01 moles) of the salt of L-N-methylephedrine and N-[2-(methoxycarbonyl)-1-methylvinyl]-D-phenylglycine (Example 2, supra.) and 50 ml. of water. To the resulting solution there is added with stirring 1 ml. of concentrated hydrochloric acid. After standing for about 30 minutes at room temperature, the reaction mixture is neutralized to a pH of circa 6–7 with sodium hydroxide addition. A precipitate appears which is removed by filtration, washed with water and dried to give 1.22 grams (79% of theory) of D-phenylglycine in the form of white crystals, M.P. 305°–310°C.; $[\alpha]_d^{25} = -158°$ (4% in 1N HCl).

EXAMPLE 9

To an appropriate reaction vessel there is charged 2.19 grams (0.0050 moles) of the salt of D-N-methylephedrine and N-[2-methoxycarbonyl)-methylvinyl]-L-phenylalanine (Example 3., supra.), and a mixture of 7 ml. of methylene chloride, 3 ml. of methanol and 0.41 ml. of concentrated hydrochloric acid. The resulting reaction mixture is a clear solution, from which a precipitation begins after about 2 minutes. After about 30 minutes, the precipitate is removed by filtration and washed with a mixture of methylene chloridemethanol (7:3, v/v). The washed precipitate is dried to give 0.62 grams 76% of theory) of L-phenylalanine in the form of white crystals, M.P. 286°–296°C. (dec.) $[\alpha]_d^{25} = -30°$ (1% in $H_2O$).

EXAMPLE 10

To a solution of two grams (0.005 moles) of the salt of L-N-methylephedrine and N-[2-(methoxycarbonyl)-1-methylvinyl]-D-valine (Example 4., supra.), 5 ml. of methanol, there is added with stirring 0.43 ml. of concentrated hydrochloric acid. There is an immediate precipitation. Upon cessation of precipitation, the reaction mixture is filtered and the residue washed with methanol. Upon drying the residue, there is obtained 0.46 grams (77% of theory) of D-valine in the form of white crystals, M.P. 305°–307°C. $[\alpha]_d^{25} = -26°$ (1% in 6N HCl).

Alkali metal salts of eneamine derivatives of α-amino acids are useful intermediates in the preparation of, for example, 6-(α-aminoacyl) penicillins (see British Pat. No. 991,586 and Long et al., supra.). They are conveniently prepared by exchanging the amine cation of the salts of the invention with an alkali metal cation such as sodium and potassium. The ion exchange is effected by conventional methods. For example, equimolar proportions of the salts of the invention are admixed with strong bases containing alkali metal cations. Representative of such strong bases are the alkali metal alcoholates such as sodium methoxide, sodium ethoxide, potassium tert-butoxide, sodium phenoxide, sodiomalonic ester and the like. The admixture of strong base and the salts of the invention is preferably carried out within a temperature range of from about 0° to about 80° and in the presence of an inert solvent as previously defined. Particularly preferred solvents are methanol, benzene, and toluene. The alkali metal salts obtained are conveniently separated from the reaction mixture by conventional methods such as by crystallization.

Prior hereto, when it was desired to prepare optically active alkali metal salts of an eneamine derivative of an α-amino acid, a complex, multistep procedure was required. First, it was necessary to resolve the racemic mixture of the α-amino acid to obtain the desired D- or L- isomer. As described above, this generally involved several steps and separative procedures. Next the optically active isomer of the α-amino acid is reacted with a strong base such as sodium hydroxide to obtain the stable sodium salt thereof which, finally, is reacted with a β-dicarbonyl compound to obtain the desired product.

Advantageously, the optically active alkali metal salts of an eneamine derivative of an α-amino acid are now prepared by use of the novel salts of the invention in a process which comprises, (1) bringing together in the presence of an inert solvent the racemate of said α-amino acid, an optically active amine base and a β-dicarbonyl compound whereby there is obtained a mixture of the D- and L- diastereoisomeric salts of said amine base and the eneamine derivative of said α-amino acid and said β-dicarbonyl compound; (2) separating the D- and L-isomers of said mixture of diastereoisomeric salts; and (3) exchanging the amine cation of said separated isomer with an alkali metal cation. Preferably, the β-dicarbonyl compound employed in step (1) above is of the formula (IV) as previously given.

The above described novel process for preparing optically active alkali metal salts of eneamine derivatives of α-amino acids described above employs fewer procedural steps than the prior art methods and results in improved overall yields.

EXAMPLE 11

A solution of 2 grams (0.0045 moles) of the salt of D-N-methylephedrine and N-[2-(methoxycarbonyl)-1-methylvinyl]-D-p-hydroxyphenylglycine (Example 1, supra.) in a mixture of 12 ml. of methanol and 0.25 ml. of methyl acetoacetate is prepared. To this solution there is added with stirring 1.13 ml. of 25.6% sodium methoxide solution and 30 ml. of benzene. The solvent is then removed from the reaction mixture under reduced pressure. To the residue there is added 20 ml. of benzene, and the resulting slurry is filtered. The residue is washed with benzene and dried under vacuum to give 1.29 grams (100% of theory) of sodium salt of N-[2-(methoxycarbonyl)-1-methylvinyl]-D-p-hydroxyphenylglycine in the form of fine, white needles, M.P., 228°C. (dec.), $[\alpha]_d^{25} = +119°$ (1% in 0.1N NaOH).

The salts of the invention will also react with 6-aminopenicillanic acids and 7-aminocephalosporanic acids to yield the corresponding 6- (α-aminoacyl)-penicillanic acids and 7-(α-aminoacyl) cephalosporanic acids. Such product acids are useful antibacterial agents; see for example, U.S. Pat. Nos. 2,985,648; 3,485,819; 3,531,470; 3,674,776; 3,192,198; and British Pat. No. 991,586, which disclose useful 6-(α-aminoacyl) penicillanic acids and 7-(α-aminoacyl) cephalosporanic acids which may be prepared using the novel salts of the invention as starting materials.

The procedures for carrying out the preparations are conventional. For example, 6-(α-aminoacyl) penicillins are prepared by following the method of British Pat. No. 991,586 but replacing the alkali metal salts of eneamine derivatives of α-amino acids as used therein with salts of the invention. Similarly, by replacing the activated forms of α-amino acids as used in the process of U.S. Pat. No. 3,485,819 with the salts of the invention, there is obtained reaction with both 6-aminopenicillanic acid and 7-aminocephalosporanic acid to obtain the corresponding α-aminoacyl derivatives. Complete details of the methods are found in the reference British Pat. No. 991,586 and U.S. Pat. No. 3,485,819, the disclosures of which are hereby incorporated herein.

Certain optically active forms of 6-(α-amino)penicillanic acids and 7-(α-amino)cephalosporanic acids are desirable for their enhanced antibacterial activity such as for example 6-(D-α-amino-p-hydroxyphenylacetamido)penicillanic acid (see for example, Long et al., supra.), 6-[D(—)α-aminophenylacetamido]penicillanic acid, and 6-[D(—)α-amino-α-1,4-cyclohexadienyl acetamido]penicillanic acid and analogous cephalosporins. Prior hereto, the preparation of such optically active penicillins required a complex multistep procedure. First, it was necessary to resolve the racemic mixture of the α-amino acid to obtain the desired D- or L- isomer. As discussed previously, this resolution procedure required several steps and difficult separations. Next, the resolved amino acid is converted to the corresponding sodium salt, and the amine group protected by acylation or by blocking through reaction with a β-dicarbonyl group. The sodium salt is then reacted with the 6-aminopenicillanic acid and the product desired to obtain the optically active penicillin. Following the same procedure, complete details for which are found in U.S. Pat. No. 3,674,776, but replacing the alkali metal salt with the novel salts of the invention (I), there is obtained the corresponding antibacterial 6-(aminoacyl)penicillanic acid.

Advantageously, optically active 6-(α-aminoacyl)penicillanic acids and 7-(α-aminoacyl)cephalosporanic acids are now prepared by a novel process through use of the novel salts of the invention as intermediates, which comprises (1) bringing together in the presence of an inert solvent the racemate of an α-amino acid, an optically active amine base and a β-dicarbonyl compound whereby there is obtained a mixture of the D- and L- diastereoisomeric salts of said amine base and the eneamine derivative of said α-amino acid and said β-dicarbonyl compound; (2) separating the D- and L- isomers of said mixture of diastereoisomeric salts; and (3) reacting the separated isomer with a member selected from the group consisting of a 6-aminopenicillanic acid and a 7-aminocephalosporanic acid.

The above described process requires fewer procedural steps than the prior art processes and results in improved overall yields.

EXAMPLE 12

A stirred suspension of 6-aminopenicillanic acid (2.16 g., 0.01 mole) in water (25 ml.) is adjusted to pH 7.8 by the addition of aqueous 10% sodium hydroxide, care being taken that the pH does not rise above 8.0 during the addition. Acetone (40 ml.) is added, and the solution is cooled to —10°C. Dry acetone (25 ml.) is stirred and held at —10° to —8°C. while ethyl chloroformate (1.0 ml., 0.0104 moles) is added, followed by 1 percent N-methylmorpholine in acetone (1.5 ml.), and finally with 4.45 gms. of the salt of D-N-methylephedrine and N-[2-(methoxycarbonyl)-1-methylvinyl]-L-p-hydroxyphenylglycine (Example 1, supra.). The mixture is stirred at —10°C. for 30 minutes, then it is added to the solution of sodium 6-aminopenicillanate described above, and washed in with cold dry acetone (20 ml.). The resulting mixture is stirred for about 20 minutes at —10°C. then the acetone is distilled off in vacuo at room temperature and isobutyl methyl ketone (40 ml.) is added to the residual aqueous solution. The resulting mixture is cooled to 5°C., stirred vigorously, and adjusted to pH 0.9 by the addition of concentrated hydrochloric acid. The mixture is maintained at pH 0.9 and 5°–10°C. for about 75 minutes, then the layers are separated. The aqueous layer is washed with isobutyl methyl ketone (10 ml.) and the residual solvent is removed in vacuo. The aqueous solution is cooled to 5°C. and adjusted to pH 5.2 with aqueous 10 percent sodium hydroxide. The resulting suspension is stirred at 5° for 5 minutes, then concentrated in vacuo at 20°C. to one third of its bulk. A crystalline solid is removed by filtration, washed with water and dried in air to give 6-[L(—)-α-amino-α-(p-hydroxyphenyl)-acetamido] penicillanic acid. The product structure is confirmed by infra-red spectra, nuclear magnetic resonance spectra and paper strip chromatography. 6-[L(—)-α-amino-α-(P-hydroxyphenyl)-acetamido]penicillanic acid is a useful antibacterial agent; see U.S. Pat. No. 3,674,776.

Similarly, following the above procedure but replacing the 6-amino-penicillanic acid as used therein with an equal molar proportion of 7-amino-cephalosporanic acid, there is obtained 7-[L(−) )-α-amino-α-(p-hydroxyphenyl)-acetamido] cephalosporanic acid.

I claim:

1. A process for preparing optically active 6-(α-aminoacetamido) penicillanic acids and 7-(α-aminoacetamido) cephalosporanic acids which comprises
   1. bringing together in the presence of an inert solvent
      a. the racemate of a monocarboxylic α-amino acid selected from the group consisting of proline, histidine, tryptophane and an acid of the formula

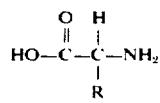

wherein R is selected from the group consisting of aliphatic of one to 20 carbon atoms, inclusive, cycloalkyl of three to eight carbon atoms, inclusive, cycloalkenyl of four to eight carbon atoms, inclusive, cycloalkadienyl of five to seven carbon atoms, inclusive, aryl of six to 12 carbon atoms, inclusive, aralkyl of seven to eleven carbon atoms, inclusive; said α-amino monocarboxylic acid unsubstituted or substituted with a group which is inert to reaction with a β-dicarbonyl compound described below:
      b. an optically active amine base with a dissociation constant of from about $10^{-9}$ to about $10^{-12}$;
      c. a β-dicarbonyl compound of the formula

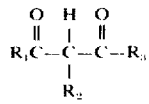

wherein $R_1$ is hydrocarbyl of one to 20 carbon atoms, inclusive, $R^2$ is hydrogen or hydrocarbyl of one to twenty carbon atoms, inclusive, $R_3$ is hydrocarbyl or hyrocarboxy, each of one to 20 carbon atoms, inclusive, $R_1$ and $R_3$ when taken together are alkylene having from two to three carbon atoms, inclusive, separating the valencies thereof, and $R_1$ and $R_2$ when taken together and $R_2$ and $R_3$ when taken together each represent alkylene having from three to four carbon atoms, inclusive, separating the valencies thereof, whereby there is obtained a mixture of the D and L-diastereoisomeric salt of said amine base and the eneamine derivative of said α-amino monocarboxylic acid and said β-dicarbonyl compound,
   2. separating the D- and L-isomers of said mixture of diastereoisomeric salts; and
   3. reacting the separated isomer with a member selected from the group consisting of 6-amino penicillanic acid and 7-aminocephalosporanic acid.

2. A process according to claim 1 wherein $R_1$ is hydrocarbyl of one to six carbon atoms, inclusive, $R_2$ is hydrogen, $R_3$ is hydrocarbyl or hydrocarboxy of one to six carbon atoms, inclusive, and $R_1$ and $R_3$ when taken together are alkylene having from two to three carbon atoms, inclusive, separating the valencies thereof.

3. A process in accordance with claim 1 wherein the alpha amino monocarboxylic acid is selected from the group consisting of α-aminophenylacetic acid, α-amino-p-hydroxyphenylacetic acid and 1,4-cyclohexadienyl-α-aminoacetic acid.

4. A process in accordance with claim 3 wherein the amine acylated is 6-aminopenicillanic acid.

5. A process in accordance with claim 2 wherein the amine acylated is 6-aminopenicillanic acid.

6. A process according to claim 1 wherein said solvent is methanol.

7. A process according to claim 1 wherein the mixture of said α-amino acid, said amine base and said carbonyl compound in step (1.) is heated to reflux temperature.

8. A process according to claim 1 wherein in step (1.) the proportion of β-dicarbonyl compound is such that there is a molar equivalent excess over the proportion of α-amino acid.

* * * * *